June 7, 1932.  N. VELTRI  1,862,288
RESILIENT WHEEL
Filed Jan. 27, 1931  2 Sheets-Sheet 1
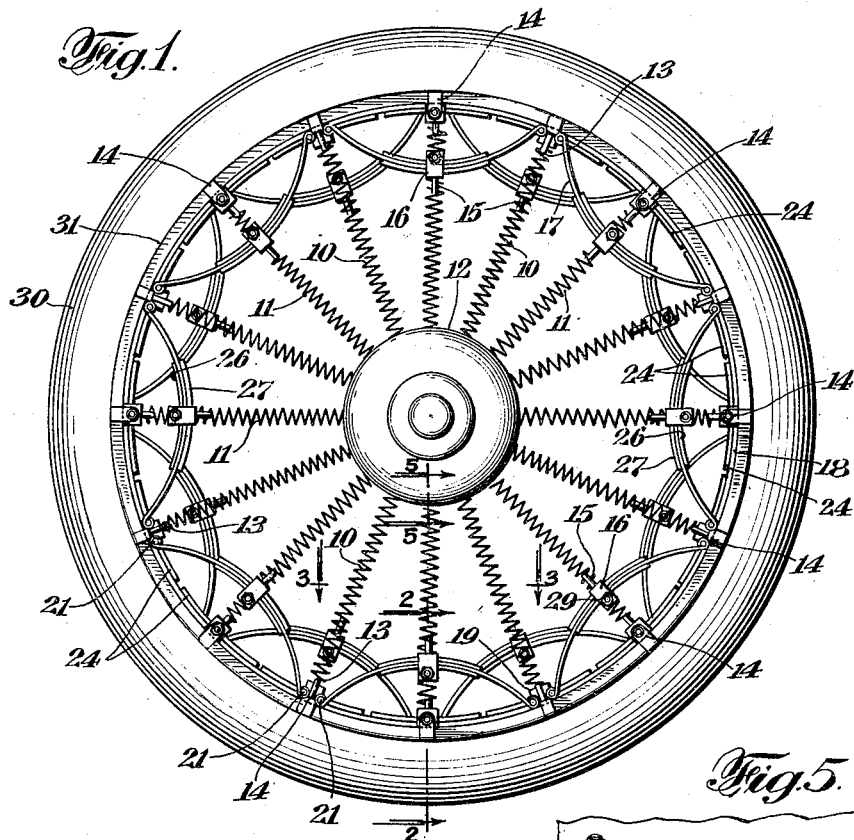
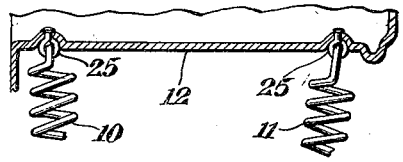
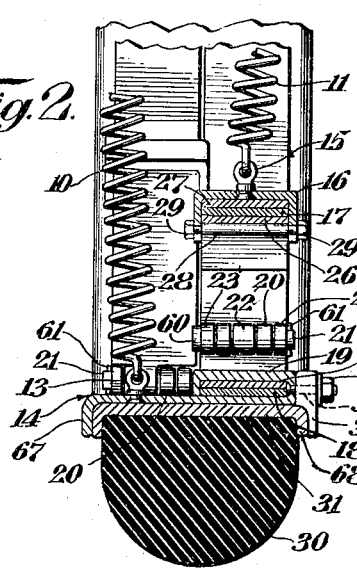
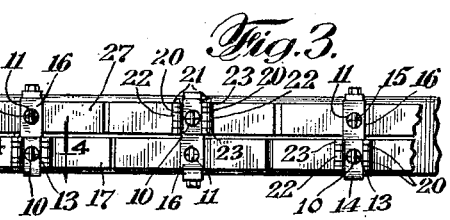
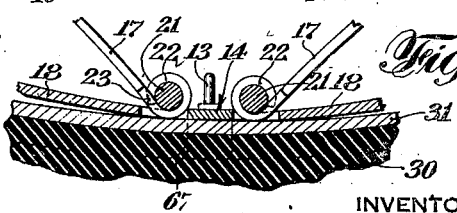
INVENTOR
Nicolas Veltri
BY Kenyon & Kenyon
ATTORNEYS

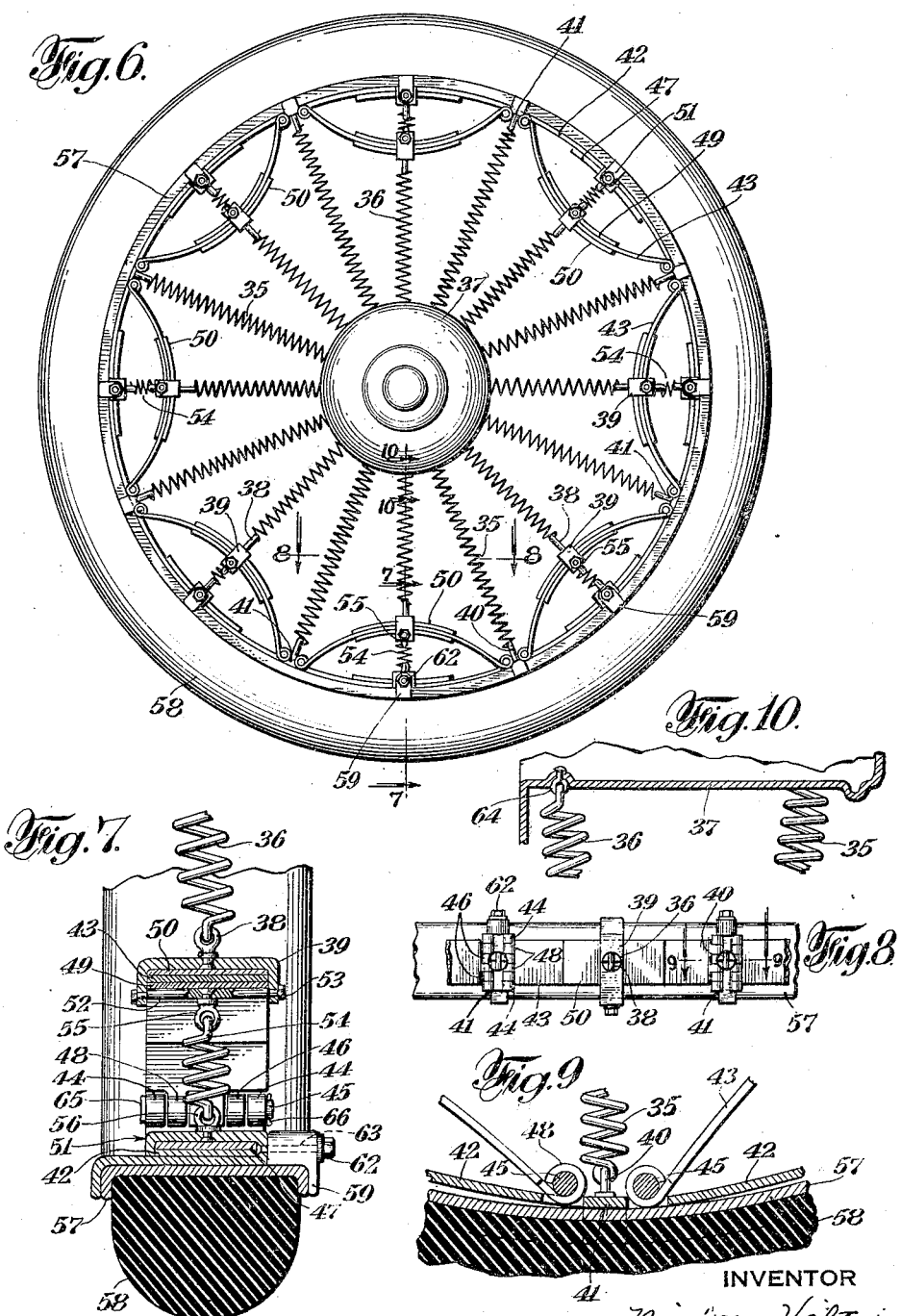

Patented June 7, 1932

1,862,288

UNITED STATES PATENT OFFICE

NICOLAS VELTRI, OF NEW YORK, N. Y.

RESILIENT WHEEL

Application filed January 27, 1931. Serial No. 511,456.

This invention relates to improvements in wheels and more particularly to vehicle wheels for trucks and automobiles. It is addressed to resilient wheel construction.

An object of the invention is to provide a strong and durable vehicle wheel which is of simple construction and easy to manufacture and which has inherent in its construction resiliency and elasticity and cushioning effect in preventing shocks and jars incident to travel on rough roads from being transferred to the body portion of the vehicle or axles thereof. It is a further object to provide a cushioning effect, and resulting comfort to passengers and saving of the vehicle from damage by jars and jolts, even where solid tires are used so that the strength, economy, and non-puncturing properties of solid tires may be enjoyed without experiencing the discomfort and damaging effect of their extremely hard riding characteristics.

It is a feature of this invention that a series of elliptical springs are jointed substantially circularly about the hub of a wheel and that radially resilient spokes connect the elliptical springs to the hub. A continuous flexible rim is maintained in position outside of said series of jointed elliptical spring members. A solid rubber tire, for example, may be mounted on the rim.

It is a further feature of this invention that a series of opposed elliptical spring members may be jointed so as to form a series of full elliptical springs arranged so as to form a substantially continuous circular exterior about the hub of the wheel. Moreover, radially resilient spokes comprising coil or helical springs emanating from the hub may be attached to said full elliptical springs at about the mid point thereof and to points of jointure between said full elliptical springs so as to form a vehicle which is highly resilient both in spokes and in rim.

It is an advantage of this invention that by combining resilient elliptical spring construction at the rim with resilient coil spring construction emanating from the hub, a high degree of resiliency can be obtained and attendant easy riding properties, with relatively small distortion of the individual parts during operation and with consequent decrease in likelihood of breakage and in instability of the wheel. It is a further advantage of this invention that the resilient parts are so arranged with respect to one another as to give strength and uniform resilience at all parts of the wheel during revolutions thereof. Further insuring uniformity of resilience and smoothness of riding, this invention is adapted preferably to the arrangement of circularly arranged parallel rows of elliptical spring members in staggered relation to one another.

It is a further feature of this invention that both the resilient spring rim members and the radially resilient spokes above described operate not only as resilient compression springs but as resilient tension springs as well, thus distributing load and shocks to many resilient members of the wheel both below and above the hub of the wheel. This affords great strength and durability with relative lightness of parts and tends to give the wheel increased resilience.

It is a further feature of this invention that resilient construction above described may be used in combination or in connection with flexible rims which are demountable. According to this invention, a readily demountable rim facilitating tire changes may be a cooperating member of a resilient wheel.

Further purposes, novel features, and advantages will appear in the following description of this invention in connection with the accompanying drawings wherein Figure 1 is a side view of a wheel embodying this invention;

Fig. 2 is an enlarged section taken on the line 2—2 of Fig. 1 showing a fragment of the rim;

Fig. 3 is a developed fragmentary view of part of the rim taken on the line 3—3 of Fig. 1;

Fig. 4 is an enlarged sectional view of one of the points of jointure of the rim taken on the line 4—4 of Fig. 3;

Fig. 5 is a fragmentary section of part of the hub taken on the line 5—5 of Fig. 1;

Fig. 6 is a side view of a wheel embodying a modified form of this invention;

Fig. 7 is an enlarged section taken on the line 7—7 of Fig. 6;

Fig. 8 is a fragmentary view of a portion of the rim taken on the line 8—8 of Fig. 6;

Fig. 9 is an enlarged sectional view of a point of jointure taken on the line 9—9 of Fig. 8; and Fig. 10 is a fragmentary section of part of the hub taken on the line 10—10 of Fig. 6.

In the preferred embodiment of this invention shown in Figs. 1, 2, 3, 4 and 5, a plurality of long coil springs 10 and shorter coil springs 11 are attached in pairs to hub 12 forming radially resilient spokes. Springs 10 and 11 of each of the pairs of coil springs emanate from hub 12 in substantially the same radial direction but are alternately placed in reversed position. Long springs 10 and short springs 11 are arranged alternately in one series adjacent one end of hub 12 while another series is arranged alternately and adjacent the other end of said hub. The coil springs 10 and 11 may be secured by means of eyes 25 affixed to hub 12.

Disposed about hub 12 are arranged substantially circularly a series of jointed elliptical spring members 18, jointed by joining means consisting of clips 14.

It is to be understood that the term "elliptical" is not to be regarded in the specification or claims as defining spring members shaped exactly in the form of a portion of a true ellipse, as it is apparent that spring members shaped in the form of segments of circles or other analogous curved forms would serve a similar purpose.

Opposed to elliptical spring members 18 are elliptical spring members 17 which are also jointed at clips 14. Members 17 and 18 taken together form in effect a series of jointed full elliptical springs having substantially circular exterior about hub 12. In the preferred form shown in Figs. 1–5 there are two parallel series of full elliptical springs arranged in staggered relation to one another.

Long springs 10 are secured at their outer ends to eyes 13 mounted on clips 14. Shorter springs 11 are secured at their outer ends to eyes 15 mounted on shackles 16 at substantially the mid portion of spring members 17.

Leaves 24 reinforce spring members 18. Spring members 17 are reinforced by inner leaves 26 and outer leaves 27. Leaves 26 and 27 are maintained in position by shackles 16, secured by means of shackle bolts 28 and nuts 29.

Clips 14 are of such construction that a part thereof forms shackles 19 for spring members 18 and reinforcing leaves 24. Clips 14 have curled portions 20 thereon which engage pins 21. Curled end portions 22 on spring members 18 engage pins 21 as do also curled end portions 23 on spring members 17. This arrangement affords jointed connection between adjacent full elliptical springs of one parallel series thereof composed of members 17 and 18 and also affords shackles for staggeredly disposed spring members 18 of the other series. Pins 21 may be provided with heads 60 on one end and small pins 61 in a hole in the other end to maintain them in position.

Fitting outside of the jointed elliptical spring members 18 is a continuous flexible rim 31 on which may be mounted solid tire 30, of any suitable material such as rubber.

It is one of the features of this invention that rim 31 is demountable with respect to spring members 18. This may be accomplished by removable lugs 32 and bolts 34 which are countersunk in shackles 19 of clips 14. Lugs 32, when fastened by nuts 33 and bolts 34, co-operate with lips 67 of clips 14 to securely hold rim 31 in position. By unscrewing nuts 33 and removing lugs 32, the rim can readily be removed. Other means than that shown of mounting rim 31, either fixedly or demountably, may be employed according to this invention.

The rim 31 may be made of a flexible metal. While rim 31 has been referred to as "continuous", it is to be understood that rims may be used according to this invention having breaks therein, such, for example, as are commonly provided on demountable rims to enable the rim to be collapsed somewhat in the replacement of tires. Moreover, other forms and styles of rims may be employed according to this invention and other means than retaining walls 68 may be employed to maintain a tire thereon.

Coil springs 10 and 11 and spring members 17 and 18 are placed in position so that there is substantially no strain either of compression or of tension placed thereon, other than that occasioned by the load borne by the wheel. When a load is placed upon the wheel it is apparent that the load and also shocks imparted to the wheel will be distributed. The coil springs and elliptical springs adjacent the point of rolling contact at the bottom of the wheel will be compressed while the coil springs and elliptical springs at the opposite side of the hub will be subjected to tension. This construction whereby load is borne both above and below the hub promotes resiliency and affords great strength and durability with relative lightness of parts.

A modified form of my invention is shown in Figs. 6, 7, 8, 9 and 10.

In this embodiment of my invention long coil springs 35 and short coil springs 36 are alternately attached about hub 37, being secured thereto by eyes 64 mounted on hub 37. Moreover, in this embodiment there is but a single series of elliptical springs circularly disposed about hub 37.

A series of elliptical spring members 42 jointed at clips 41 are disposed substantially circularly about hub 37. Elliptical spring members 43 are oppositely curved to members 42 and are also jointed at clips 41. Spring members 42 are reinforced by inner leaves 47. Spring members 43 are reinforced by inner leaves 49 and outer leaves 50.

Leaves 49 and 50 are maintained in position on spring members 43 by shackles 39 fastened in place by shackle bolts 52 and nuts 53. Leaves 47 are maintained in position on spring members 42 by shackles 51.

Curled members 44 of clips 41 engage pins 45. Curled end portions 46 on spring members 42 engage pins 45 as do also curled end portions 48 on spring members 43 thus affording freely movable jointure. Pins 45 may be provided with heads 65 at one end and small pins 66 in holes at the other end thereof to hold them in position.

Each of the short coil springs 36 is attached to eyes 38 fastened to shackles 39. Each of the long springs 35 is attached to eyes 40 fastened to clips 41.

In order to strengthen the wheel against side thrust, coil springs 35 and 36 may be secured to hub 37 alternately at points adjacent either end of said hub.

In order to further strengthen the full elliptical springs composed of spring members 42 and 43 light coil springs 54 may be employed which may be attached by eyes 55 to shackle bolts 52 and by eyes 56 to shackles 51.

A demountable rim 57 on which solid tire 58 is mounted, of any suitable material such as rubber, may be secured in position by lugs 59. Lugs 59 may be tightened to position or released and removed by turning nuts 62 on bolts 63 countersunk in shackles 51.

While this invention has been described in connection with the specific embodiments shown in the drawings, it is to be understood that this has been done merely for convenience in description and for purposes of illustration, and that the true scope of this invention is not to be regarded as limited thereby.

I claim:

1. A vehicle wheel comprising a hub, a plurality of jointed full elliptical springs arranged with a substantially circular exterior about said hub, a continuous flexible rim fitting over said circularly arranged jointed full elliptical springs, and radially resilient spokes attached at their inner ends to said hub and attached at their outer ends alternately at the mid portions of said full elliptical springs and at points of jointure between said full elliptical springs.

2. A vehicle wheel comprising a hub, a first series of elliptical spring members arranged substantially circularly about said hub, jointing means between individual spring members of said series, a continuous flexible rim outside of said jointed spring members, means for maintaining said rim in position, a second series of elliptical spring members oppositely curved to the spring members of said first series and jointed by the aforesaid jointing means, and a plurality of radially extending coil springs attached at their inner ends to said hub and at their outer ends alternately to said second series of elliptical spring members at about the midpoint thereof and to said jointing means.

3. A vehicle wheel comprising a hub, a first series of elliptical spring members arranged substantially circularly about said hub, jointing means between individual spring members of said series, a continuous flexible rim outside of said jointed spring members, means for maintaining said rim in position, a second series of elliptical spring members oppositely curved to the spring members of said first series and jointed by the aforesaid jointing means, radially extending coil springs attached to said elliptical spring members of said first and second series thereof at about the mid points thereof, and a plurality of radially extending coil springs attached at their inner ends to said hub and at their outer ends alternately to said second series of elliptical spring members at about the mid point thereof and to said jointing means.

4. A vehicle wheel comprising a hub, a first series of elliptical spring members jointed at jointing means and arranged substantially circularly about said hub, shackles at about the mid point of said spring members, a continuous flexible rim outside of said spring members, means attached to said shackles of said first series of springs for holding said rim in position, a second series of elliptical spring members oppositely curved to said first spring members and jointed at points of jointure corresponding to points of jointure of said first series of spring members, shackles at about the mid point of said second series of elliptical spring members, and a plurality of radially extending coil spring spokes attached at their inner ends to the hub and at their outer ends alternately to said shackles on said second series of elliptical spring members and to said points of jointure between said first and second series of elliptical spring members.

5. A vehicle wheel comprising a hub, two parallel series of full elliptical springs in staggered relation to one another, a plurality of radially resilient spokes attached at their inner ends to said hub adjacent to one end of said hub and attached at their outer ends alternately to points of juncture between adjacent full elliptical springs of one of said series thereof and to mid portions of said springs of said series, and a plurality of radially resilient spokes attached at their inner ends adjacent to the other end of said hub and alternately at their outer ends to points of juncture between adjacent full elliptical springs of the other of said series thereof and to mid portions of said springs of said other series.

6. A vehicle wheel comprising a hub, two parallel series of jointed full elliptical springs in staggered relation to one another disposed with substantially circular exterior about said hub, a flexible rim fitting over said parallel series of jointed elliptical springs and radially extending helical springs attached at their inner ends to said hub and at their outer ends some to points of jointure between said full elliptical springs and others to points about mid position of said full elliptical springs.

In testimony whereof, I have signed my name to this specification.

NICOLAS VELTRI.